United States Patent
Wang et al.

(10) Patent No.: US 10,005,881 B2
(45) Date of Patent: Jun. 26, 2018

(54) WAVELENGTH-CONVERTING POLYMERS, METHOD FOR FABRICATING THE SAME, AND WAVELENGTH-CONVERTING DEVICES EMPLOYING THE SAME

(71) Applicant: INDUSTRIAL TECHNOLOGY RESEARCH INSTITUTE, Hsinchu (TW)

(72) Inventors: Wen-Hsien Wang, Tainan (TW); Tzong-Ming Lee, Hsinchu (TW); Min-Tsung Kuan, Taichung (TW); Ming-Chia Li, Taichung (TW); Mei-Ru Lin, Changhua (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 172 days.

(21) Appl. No.: 14/859,946

(22) Filed: Sep. 21, 2015

(65) Prior Publication Data

US 2016/0122470 A1    May 5, 2016

(30) Foreign Application Priority Data

Oct. 31, 2014    (TW) .............................. 103137751 A

(51) Int. Cl.
    *C09K 11/06*      (2006.01)
    *C08G 63/82*      (2006.01)
    (Continued)

(52) U.S. Cl.
    CPC ............ *C08G 63/823* (2013.01); *C08G 63/08* (2013.01); *C08G 63/6852* (2013.01); *G02B 1/14* (2015.01);
    (Continued)

(58) Field of Classification Search
    CPC .. C09K 11/06; C09K 11/00; C09K 2211/1475
    See application file for complete search history.

(56) References Cited

U.S. PATENT DOCUMENTS

| 4,590,265 A | 5/1986 | Bogan et al. |
| 5,017,431 A | 5/1991 | Otani et al. |

(Continued)

FOREIGN PATENT DOCUMENTS

| CN | 1333790 A | 1/2002 |
| CN | 1092692 C | 10/2002 |

(Continued)

OTHER PUBLICATIONS

Brouwer, H. J. et al, "Novel high efficiency copolymer laser dye in the blue wavelength region", Appl. Phys. Lett., Jun. 19, 1995, vol. 66, No. 25, pp. 3404-3406.

(Continued)

*Primary Examiner* — Michael A Salvitti
(74) *Attorney, Agent, or Firm* — Birch, Stewart, Kolasch & Birch, LLP

(57) ABSTRACT

A wavelength-converting polymer, a method for fabricating the same and a wavelength-converting device employing the same are provided. The wavelength-converting polymer has a chemical structure represented by formula (I):

(Continued)

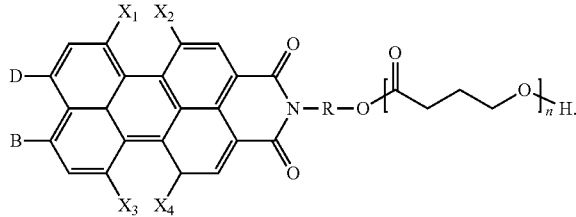

(I)

In formula (I), B and D are the same or different and independently include hydrogen, C1-8 alkyl group, C1-8 alkoxy group, aryloxy group, carboxyl group, —COOK, —COONa or —NH$_2$, or B and D are connected to form a heteroaromatic ring,

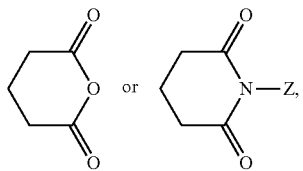

wherein Z is hydrogen, C1-8 alkyl group, cycloalkyl group or aryloxy group, $X_1$-$X_4$ are the same or different and independently include hydrogen, halogen, C1-8 alkyl group or C1-8 alkoxy group, R is C1-8 alkyl group with or without substitution, and n is an integer of 5 to 1,000.

20 Claims, 5 Drawing Sheets

(51) Int. Cl.
  *C08G 63/08* (2006.01)
  *G02B 1/14* (2015.01)
  *C08G 63/685* (2006.01)
  *C09K 11/00* (2006.01)

(52) U.S. Cl.
  CPC ............ *C09K 11/00* (2013.01); *C09K 11/06* (2013.01); *C09K 2211/1475* (2013.01)

(56) References Cited

U.S. PATENT DOCUMENTS

| | | | |
|---|---|---|---|
| 5,852,072 A * | 12/1998 | Banning | C08G 18/38 523/161 |
| 6,001,936 A * | 12/1999 | Barrera | C08F 283/00 522/121 |
| 6,491,749 B1 * | 12/2002 | Langhals | C07D 471/06 106/287.21 |
| 6,916,928 B2 * | 7/2005 | Becker | C07D 471/06 252/301.16 |
| 7,294,152 B2 | 11/2007 | Lagrange | |
| 7,381,760 B2 | 6/2008 | Aida et al. | |
| 7,618,710 B2 | 11/2009 | Wei et al. | |
| 8,465,675 B2 | 6/2013 | Kuan et al. | |
| 8,652,723 B2 | 2/2014 | Faucher et al. | |
| 2003/0203211 A1 | 10/2003 | Wei et al. | |
| 2004/0266911 A1 | 12/2004 | Aida et al. | |
| 2005/0080189 A1 * | 4/2005 | Waters | C09B 69/10 525/165 |
| 2005/0188475 A1 | 9/2005 | Lagrange | |
| 2006/0002285 A1 | 1/2006 | Olson et al. | |
| 2007/0184278 A1 | 8/2007 | Wei et al. | |
| 2008/0148496 A1 | 6/2008 | Plos et al. | |
| 2012/0039563 A1 * | 2/2012 | Shibata | G02B 6/1221 385/14 |
| 2012/0065359 A1 * | 3/2012 | Faucher | C08G 63/08 528/354 |
| 2012/0092753 A1 | 4/2012 | Heikenfeld et al. | |
| 2012/0227807 A1 * | 9/2012 | Kato | H01L 51/447 136/257 |
| 2012/0231386 A1 | 9/2012 | Faucher et al. | |
| 2012/0273772 A1 * | 11/2012 | Prakash | B82Y 10/00 257/40 |
| 2013/0078499 A1 | 3/2013 | Casasanta | |
| 2013/0088853 A1 * | 4/2013 | Kingsley | F21V 9/16 362/84 |
| 2013/0170192 A1 * | 7/2013 | Wu | A47G 33/08 362/183 |
| 2014/0153247 A1 * | 6/2014 | Lub | C09K 11/06 362/293 |
| 2015/0166882 A1 * | 6/2015 | Hikmet | C09K 11/06 257/98 |
| 2015/0183956 A1 * | 7/2015 | Syamakumari | C08K 5/3437 525/282 |
| 2016/0122470 A1 * | 5/2016 | Wang | C08G 63/823 428/220 |
| 2016/0122476 A1 * | 5/2016 | Reynolds | C08G 75/00 528/378 |
| 2016/0247952 A1 * | 8/2016 | Kuan | H01L 31/0481 |

FOREIGN PATENT DOCUMENTS

| | | |
|---|---|---|
| CN | 1395587 A | 2/2003 |
| CN | 1411486 A | 4/2003 |
| CN | 1447843 A | 10/2003 |
| CN | 1183187 C | 1/2005 |
| CN | 1565023 A | 1/2005 |
| CN | 1591052 A | 3/2005 |
| CN | 1636004 A | 7/2005 |
| CN | 1639216 A | 7/2005 |
| CN | 1649732 A | 8/2005 |
| CN | 1784727 A | 6/2006 |
| CN | 1297537 C | 1/2007 |
| CN | 1310043 C | 4/2007 |
| CN | 1318412 C | 5/2007 |
| CN | 100408606 C | 8/2008 |
| CN | 101568593 A | 10/2009 |
| CN | 101573663 A | 11/2009 |
| CN | 102203951 A | 9/2011 |
| CN | 102369474 A | 3/2012 |
| CN | 202246523 U | 5/2012 |
| CN | 103183971 A | 7/2013 |
| CN | 103261088 A | 8/2013 |
| CN | 103614089 A | 3/2014 |
| CN | 103635179 A | 3/2014 |
| CN | 103642417 A | 3/2014 |
| EP | 2 355 162 A1 | 8/2011 |
| TW | 200512481 A | 4/2005 |
| TW | 200835944 A | 9/2008 |
| TW | 201036176 A1 | 10/2010 |
| TW | I380058 B | 12/2012 |
| TW | 201311861 A1 | 3/2013 |
| TW | I395806 B1 | 5/2013 |
| TW | M455622 U1 | 6/2013 |
| WO | WO 2004/068183 A3 | 8/2004 |

OTHER PUBLICATIONS

Cimrova, V. et al, "Novel Soluble Fluorene-Thienothiadiazole and Fluorene-Carbazole Copolymers for Optoelectronics", Macromolecular Symposia, 2010, vol. 295, pp. 65-70.

Song, S. et al, "Stabilized Polymers with Novel Indenoindene Backbone against Photodegradation for LEDs and Solar Cells", Macromolecules, 2008, vol. 41, pp. 7296-7305.

(56) References Cited

OTHER PUBLICATIONS

Taiwan Office Action for Appl. No. 103137751 dated Jun. 2, 2015.

* cited by examiner

WAVELENGTH-CONVERTING POLYMERS, METHOD FOR FABRICATING THE SAME, AND WAVELENGTH-CONVERTING DEVICES EMPLOYING THE SAME

CROSS REFERENCE TO RELATED APPLICATIONS

This Application claims the priority of Taiwan Patent Application No. 103137751, filed on Oct. 31, 2014, the entirety of which is incorporated by reference herein.

TECHNICAL FIELD

The technical field relates to a wavelength-converting polymer, a method for fabricating the same and a wavelength-converting device employing the same.

BACKGROUND

Visible light enters the macula lutea of the eye to form images and colors, and vision is thus generated thereby. The energy of blue light is the greatest among other colors of light, and it causes the most damage to eyes since it causes damage to the retinal fundus by directly penetrating the cornea and causes injury to photoreceptor cells of the macula lutea.

In order to maintain better viewing quality, screens of most 3C products usually emit higher luminance and stronger blue light than a traditional cathode ray tube (CRT). The blue light emitted from the screen of a traditional CRT accounts for 20%, the blue light emitted from the screen of LED accounts for 64%, and the blue light emitted from the screen of a mobile digital device, such as a tablet computer or a smartphone, for example, accounts for more than 95%. Modern people frequently use 3C products, including computers and smartphones, and look steadily at their screens for long periods of time. How to prevent eyes from damage caused by blue light has become an important topic.

In recent years, in order to protect users' eyes from damage caused by blue light emitted from 3C products, a blue light-filtering screen protector combined with the effect of blue light conversion was born. However, the blue light-filtering screen protector currently on the market is affixed to the screen, and the frame will turn yellow. The higher to filtering amount, the more the frame turns yellow, which causes color distortion.

Therefore, development of a wavelength-converting material suitable for application on a screen is an important topic.

SUMMARY

In accordance with one embodiment of the disclosure, a wavelength-converting polymer is provided. The wavelength-converting polymer has a chemical structure represented by formula (I):

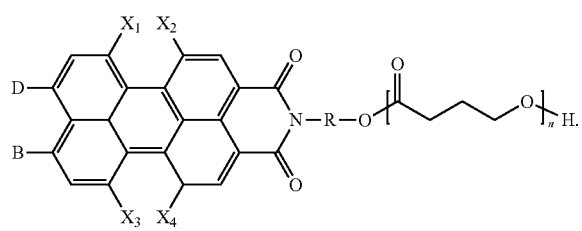

In formula (I), B and D are the same or different and independently include hydrogen, C1-8 alkyl group, C1-8 alkoxy group, aryloxy group, carboxyl group, —COOK, —COONa or —NH$_2$, or B and D are connected to form a heteroaromatic ring,

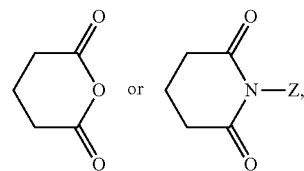

wherein Z is hydrogen, C1-8 alkyl group, cycloalkyl group or aryloxy group, $X_1$-$X_4$ are the same or different and independently include hydrogen, halogen, C1-8 alkyl group or C1-8 alkoxy group, R is C1-8 alkyl group with or without substitution, and n is an integer of 5 to 1,000.

In accordance with another embodiment of the disclosure, a method for fabricating a wavelength-converting polymer is provided. The fabrication method comprises providing a fluorescent ring-opening polymerization initiator, caprolactone, a catalyst and organic solvent, and adding the fluorescent ring-opening polymerization initiator, the caprolactone and the catalyst to the organic solvent with heating to react to form a polymer, wherein the fluorescent ring-opening polymerization initiator has a chemical structure represented by formula (II):

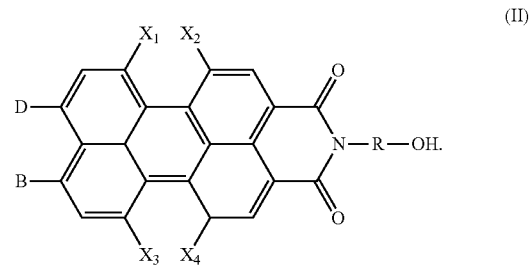

In formula (II), B and D are the same or different and independently include hydrogen, C1-8 alkyl group, C1-8 alkoxy group, aryloxy group, carboxyl group, —COOK, —COONa or —NH$_2$, or B and D are connected to form a heteroaromatic ring,

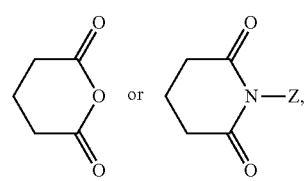

wherein Z is hydrogen, C1-8 alkyl group, cycloalkyl group or aryloxy group, $X_1$-$X_4$ are the same or different and independently include hydrogen, halogen, C1-8 alkyl group or C1-8 alkoxy group, and R is C1-8 alkyl group with or without substitution.

In accordance with another embodiment of the disclosure, a wavelength-converting device is provided. The wavelength-converting device comprises a substrate comprising a release layer, a wavelength-converting layer, a polyester layer and a protection layer. The wavelength-converting layer is disposed on a surface of the release layer. The polyester layer is disposed on a surface of the wavelength-converting layer, opposite the release layer. The protection layer is disposed on a surface of the polyester layer, opposite the wavelength-converting layer. The wavelength-converting layer comprises a wavelength-converting polymer having a chemical structure represented by formula (I):

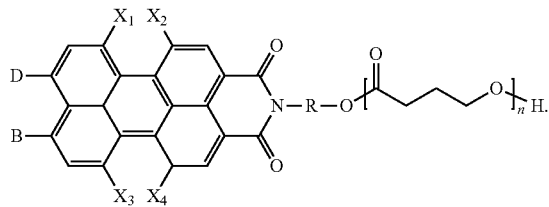
(I)

In formula (I), B and D are the same or different and independently include hydrogen, C1-8 alkyl group, C1-8 alkoxy group, aryloxy group, carboxyl group, —COOK, —COONa or —NH$_2$, or B and D are connected to form a heteroaromatic ring,

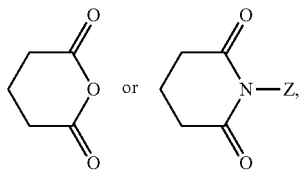

wherein, Z is hydrogen, C1-8 alkyl group, cycloalkyl group or aryloxy group, $X_1$-$X_4$ are the same or different and independently include hydrogen, halogen, C1-8 alkyl group or C1-8 alkoxy group, R is C1-8 alkyl group with or without substitution, and n is an integer of 5 to 1,000.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

Figure 1:
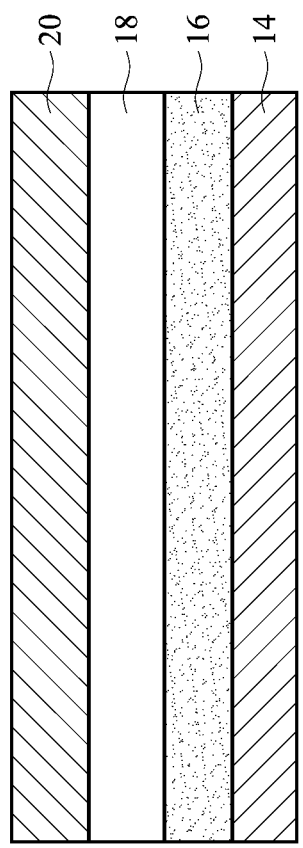
FIG. 1 is a cross-sectional structural view of a wavelength-converting device in accordance with one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are shown schematically in order to simplify the drawing.

In accordance with one embodiment of the disclosure, a wavelength-converting polymer is provided. The wavelength-converting polymer has a chemical structure represented by formula (I):

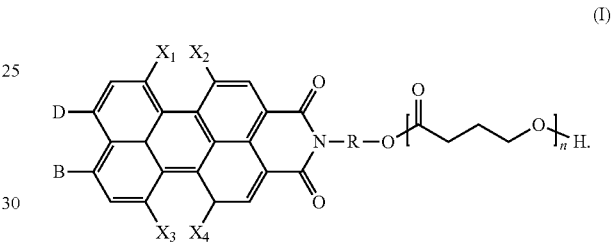
(I)

In formula (I), B and D may be the same or different and may independently include hydrogen, C1-8 alkyl group, C1-8 alkoxy group, aryloxy group, carboxyl group, —COOK, —COONa or —NH$_2$, or B and D may be connected to form a heteroaromatic ring,

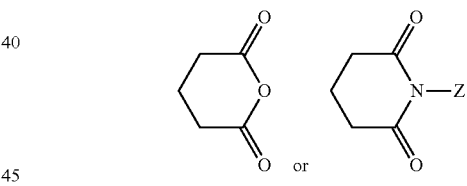

(Z may comprise hydrogen, C1-8 alkyl group, cycloalkyl group or aryloxy group such as substituted or unsubstituted phenoxy group). $X_1$-$X_4$ may be the same or different and may independently include hydrogen, halogen, C1-8 alkyl group or C1-8 alkoxy group. R may comprise C1-8 alkyl group with or without substitution, n is an integer of 5 to about 1,000.

In accordance with one embodiment of the disclosure, the wavelength-converting polymer has a weight average molecular weight ranging from about 500 g/mole to about 100,000 g/mole.

In accordance with one embodiment of the disclosure, the wavelength-converting polymer may comprise:

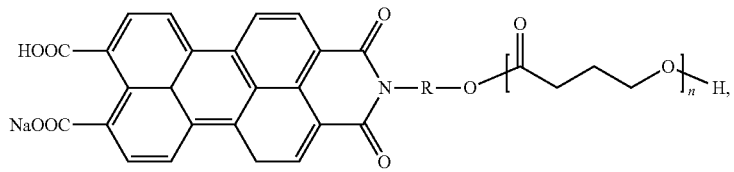

-continued

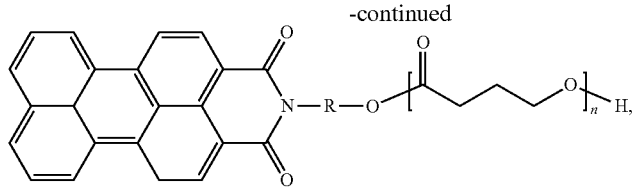

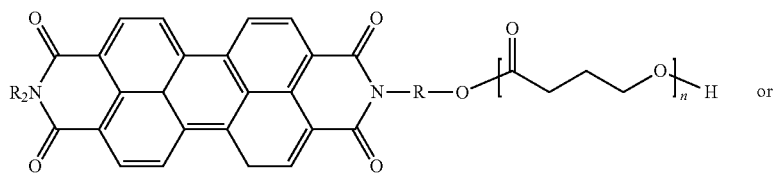  or

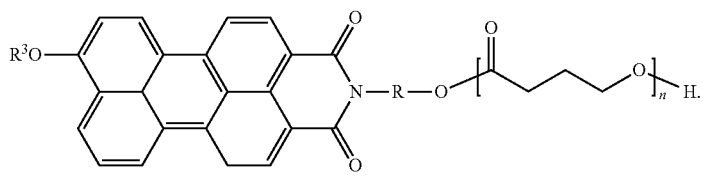

In such formulas, R may comprise C1-8 alkyl group with or without substitution. R² may comprise hydrogen, C1-8 alkyl group or cycloalkyl group. R³ may comprise C1-8 alkyl group or substituted or unsubstituted benzene. n is an integer of 5 to about 1,000.

In accordance with one embodiment of the disclosure, the wavelength-converting polymer may comprise:

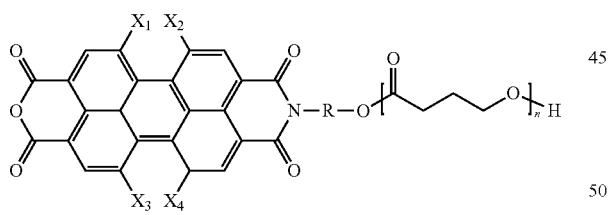

In the formula, R may comprise C1-8 alkyl group with or without substitution. $X_1$-$X_4$ may be the same or different and may independently include hydrogen, halogen, C1-8 alkyl group or C1-8 alkoxy group. n is an integer of 5 to about 1,000.

In accordance with another embodiment of the disclosure, a method for fabricating a wavelength-converting polymer is provided. The fabrication method comprises providing a fluorescent ring-opening polymerization initiator, caprolactone, a catalyst and organic solvent, and adding the fluorescent ring-opening polymerization initiator, the caprolactone and the catalyst to the organic solvent with heating to react to form a polymer. The fluorescent ring-opening polymerization initiator has a chemical structure represented by formula (II):

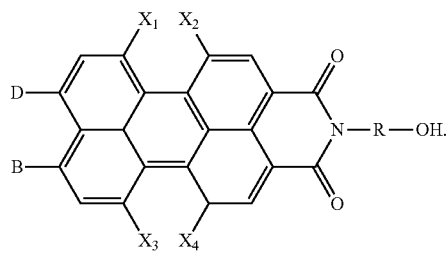

In formula (II), B and D may be the same or different and may independently include hydrogen, C1-8 alkyl group, C1-8 alkoxy group, aryloxy group, carboxyl group, —COOK, —COONa or —NH₂, or B and D may be connected to form a heteroaromatic ring,

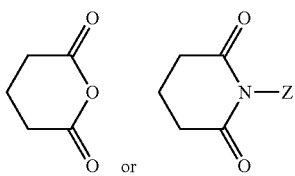

(Z may comprise hydrogen, C1-8 alkyl group, cycloalkyl group or aryloxy group such as substituted or unsubstituted phenoxy group). $X_1$-$X_4$ may be the same or different and may independently include hydrogen, halogen, C1-8 alkyl group or C1-8 alkoxy group. R may comprise C1-8 alkyl group with or without substitution.

The detailed chemical structures of the wavelength-converting polymers represented by formula (I) obtained from a series of Examples of the disclosure are shown in Table 1.

TABLE 1
| Examples | Chemical structures of the wavelength-converting polymers | Abbreviation |
|---|---|---|
| 1 | 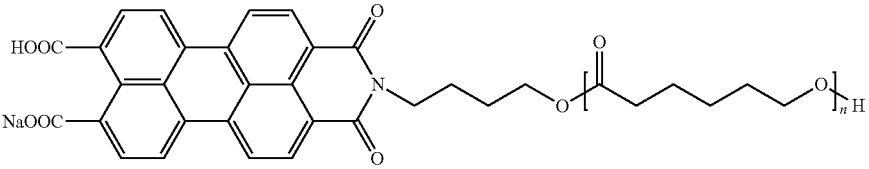 | PCL-1 |
| 2 | 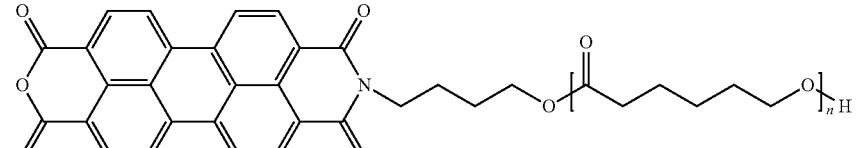 | PCL-2 |
| 3 | 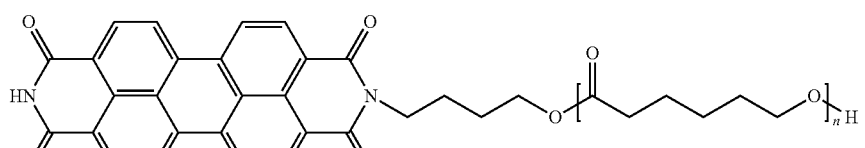 | PCL-3 |
| 4 | 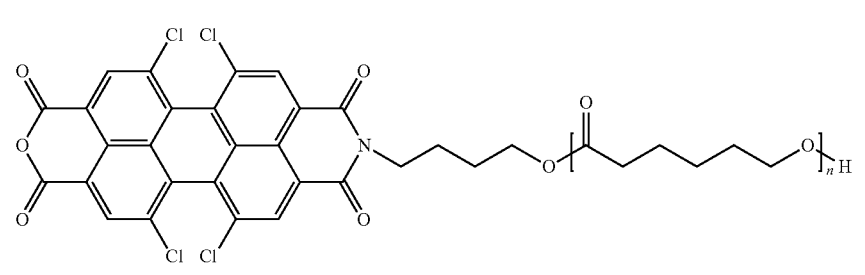 | PCL-4 |
| 5 | 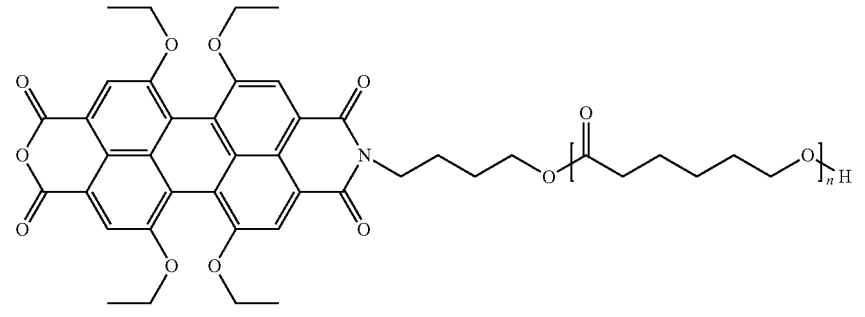 | PCL-5 |
| 6 | 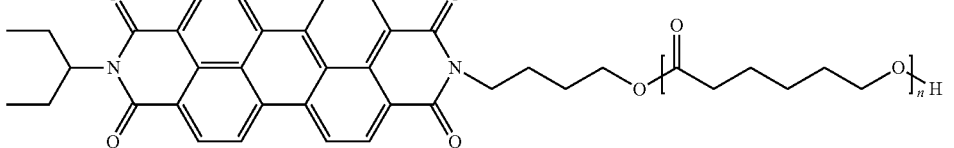 | PCL-6 |
| 7 | 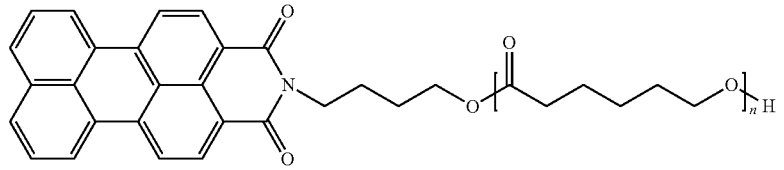 | PCL-7 |

TABLE 1-continued

| Examples | Chemical structures of the wavelength-converting polymers | Abbreviation |
|---|---|---|
| 8 | ![PCL-8 structure] | PCL-8 |

Referring to FIG. 1, a cross-sectional structural view of a wavelength-converting device 10 described by the disclosure is shown. The wavelength-converting device 10 comprises a substrate 14, a wavelength-converting layer 16, a polyester layer 18 and a protection layer 20. The substrate 14 may comprise a release layer, a glass substrate, a plastic substrate, a semiconductor substrate, display devices or handheld devices. The release layer may comprise silicon-containing resin, fluorine-containing resin or silicon/fluorine-containing resin. The polyester layer 18 may comprise polyester (PET), polycarbonate (PC), poly(methyl methacrylate (PMMA) or cyclo olefin polymer (COP). The protection layer 20 has scratch-resistant and fingerprint-resistant properties, and may comprise acrylic resin, silicon-containing acrylic resin, fluorine-containing acrylic resin, silicon/fluorine-containing acrylic resin, silicon-containing resin, fluorine-containing resin or silicon/fluorine-containing resin.

The wavelength-converting layer 16 comprises at least one wavelength-converting polymer having formula (I) described by the disclosure. The wavelength-converting layer 16 may further comprise a resin. The resin may comprise ethylene-vinyl acetate (EVA), thermoplastic urethane (TPU) or polyvinyl butyral (PVB). The wavelength-converting polymer and the resin in the wavelength-converting layer 16 have a weight ratio ranging from about 0.1:99.9 to about 20:80.

The wavelength-converting polymer represented by formula (I) described by the disclosure has the effect of wavelength conversion, capable of absorbing short-wavelength blue light and emitting long-wavelength fluorescence. Therefore, the wavelength-converting device fabricated therefrom can filter the blue light that harms the eyes and convert the blue light into a light with a longer wavelength. When the wavelength-converting device is affixed to the screen, the color is less distorted, without affecting the viewing quality.

EXAMPLES

Example 1

Synthesis of the Polymer PCL-1
Scheme:

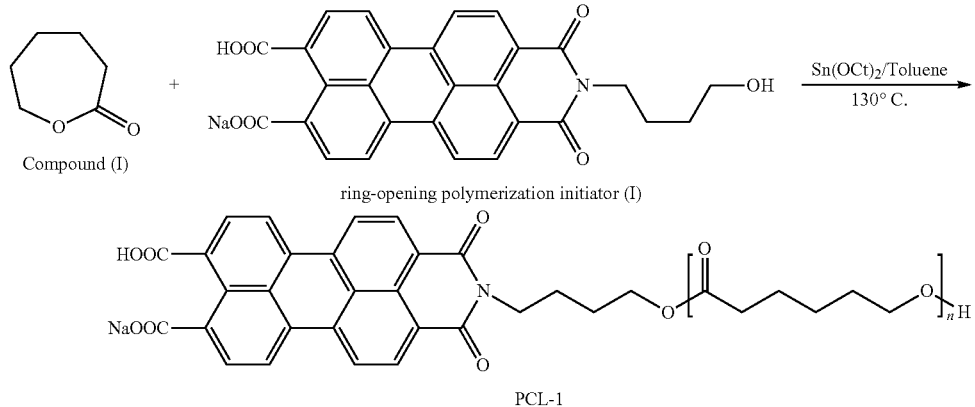

10 g of ε-caprolactone (compound (I)) (877 mmole), 0.01 g of tin(II) 2-ethylhexanoate (Sn(OCt)$_2$) and 0.01 g of ring-opening polymerization initiator (I) (0.020 mmole) were placed in a 0.5 L of round-bottom flask. 10 g of toluene used as a reaction solvent was then added to the flask under room temperature. After the flask was sealed, the reactants were reacted at 130° C. for 8 hours. After the flask was cooled in an ice bath for one hour, 50 ml of methanol was slowly added to the flask and precipitate was then gradually produced. After filtering and drying, 6.1 g of orange solid (PCL-1) was obtained.

Figure 2:
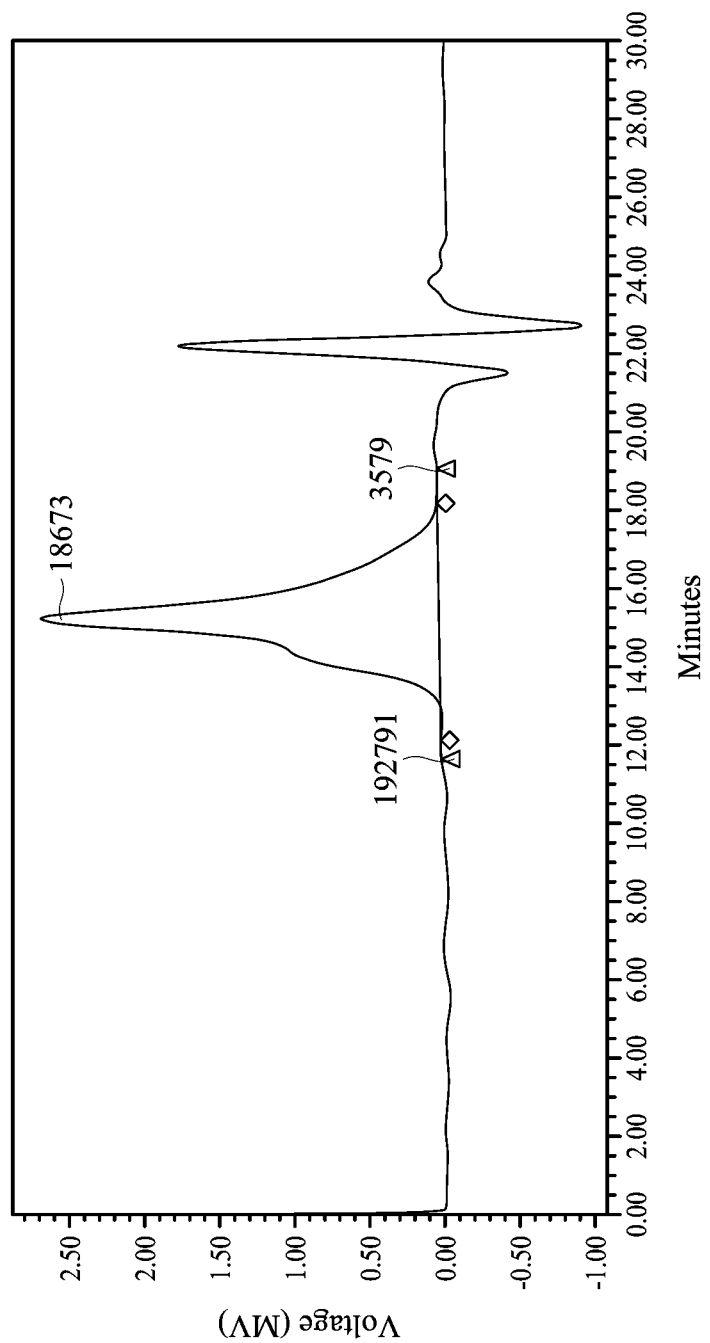
FIG. 2 is a molecular weight distribution (polydispersity index, PDI) figure of the polymer PCL-1 in accordance with one embodiment of the disclosure.
Figure 3:
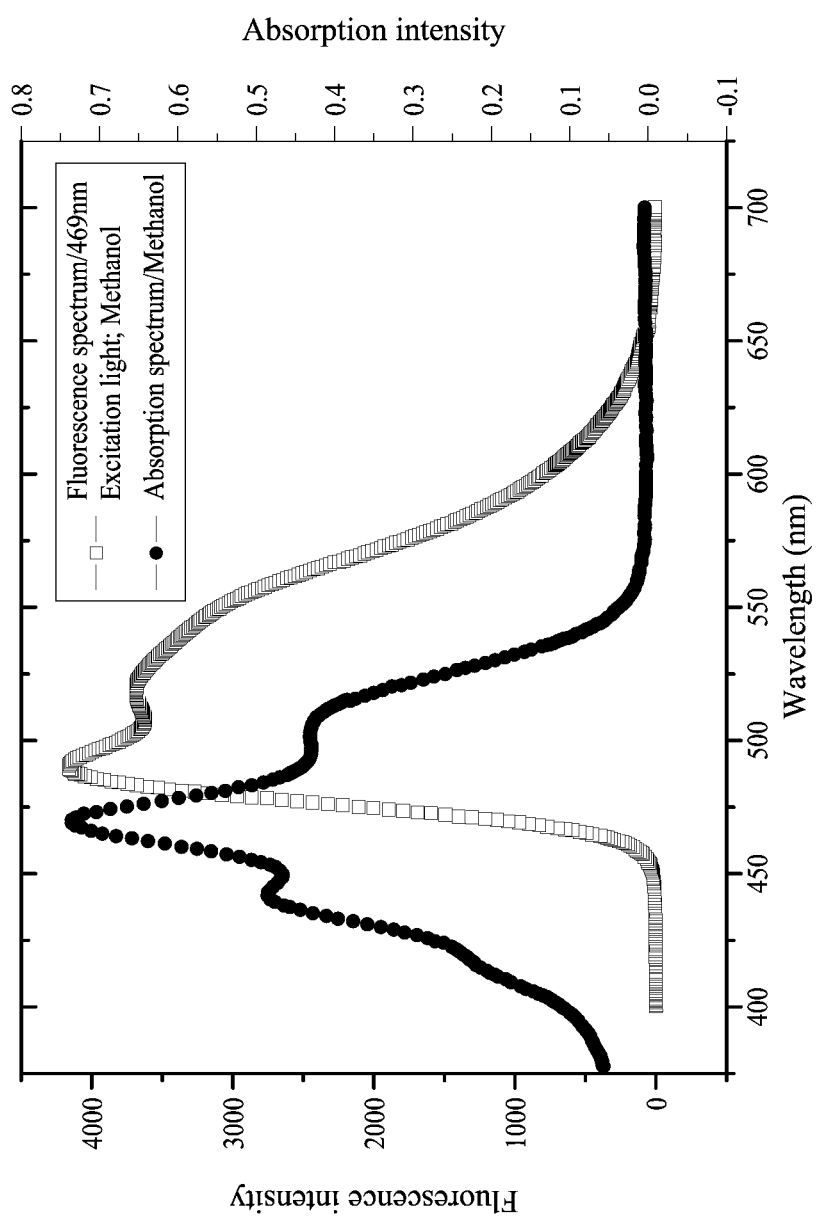
FIG. 3 shows absorption spectra and fluorescence spectra of the polymer PCL-1 in accordance with one embodiment of the disclosure.

The average number molecular weight of the polymer PCL-1 was measured by gel permeation chromatography (GPC) and was 18,673 g/mole, and the molecular weight distribution (polydispersity index, PDI) thereof was 1.22 (as shown in FIG. 2). The absorption spectra and fluorescence spectra of the polymer PCL-1 were measured by absorption and fluorescence spectroscopy (as shown in FIG. 3).

Example 2

Synthesis of the Polymer PCL-2
Scheme:

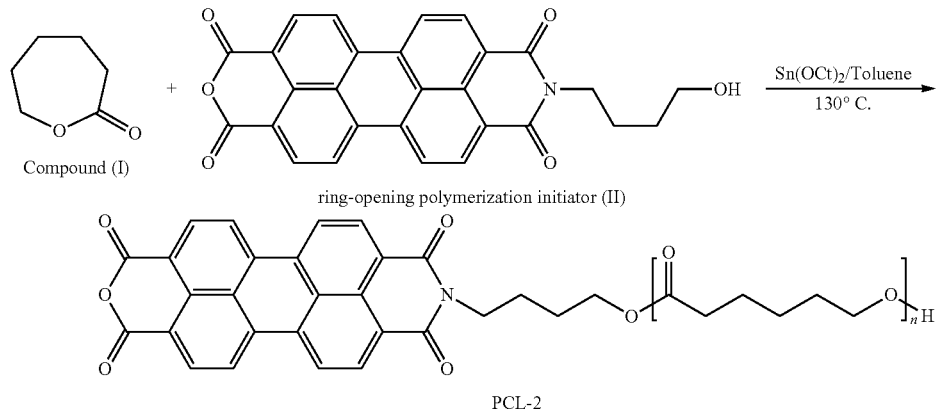

10 g of ε-caprolactone (compound (I)) (877 mmole), 0.01 g of tin(II) 2-ethylhexanoate (Sn(OCt)$_2$) and 0.01 g of ring-opening polymerization initiator (II) (0.022 mmole) were placed in a 0.5 L of round-bottom flask. 10 g of toluene used as a reaction solvent was then added to the flask under room temperature. After the flask was sealed, the reactants were reacted at 130° C. for 8 hours. After the flask was cooled in an ice bath for one hour, 50 ml of methanol was slowly added to the flask and precipitate was then gradually produced. After filtering and drying, 7.3 g of orange solid (PCL-2) was obtained.

Figure 4:
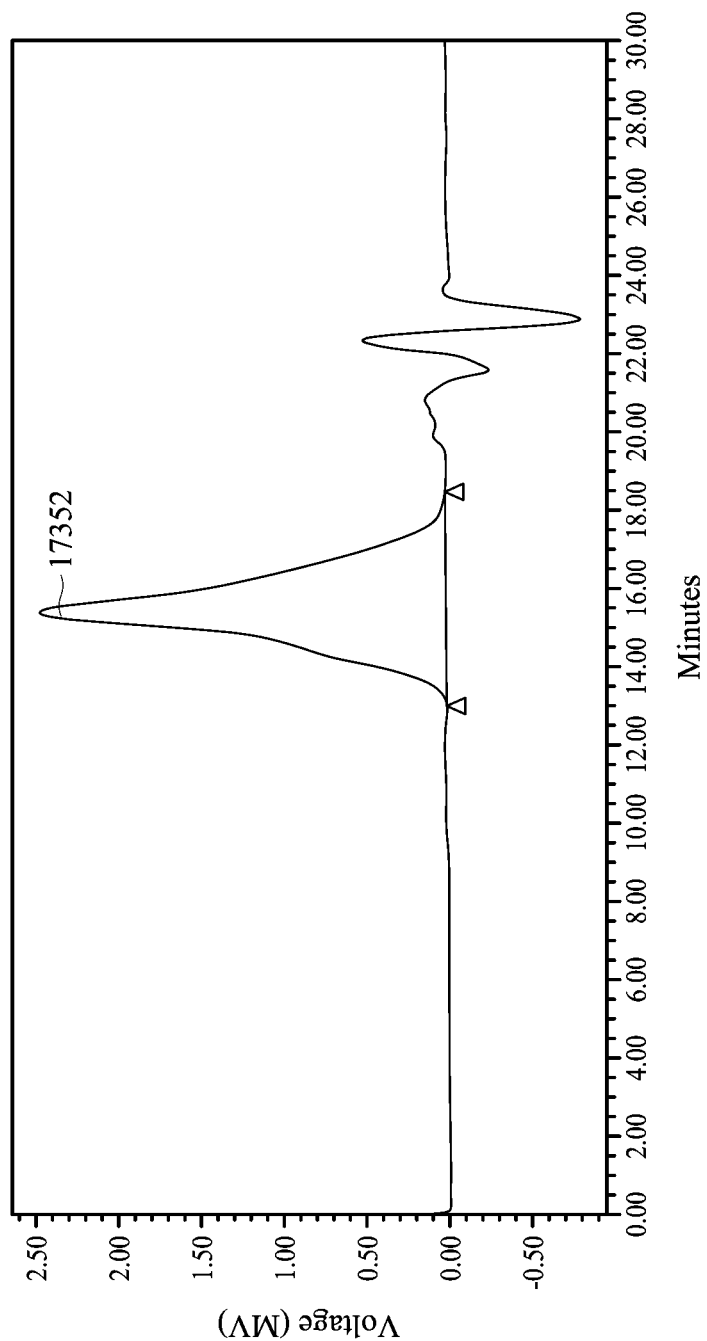
FIG. 4 is a molecular weight distribution (polydispersity index, PDI) figure of the polymer PCL-2 in accordance with one embodiment of the disclosure.
Figure 5:
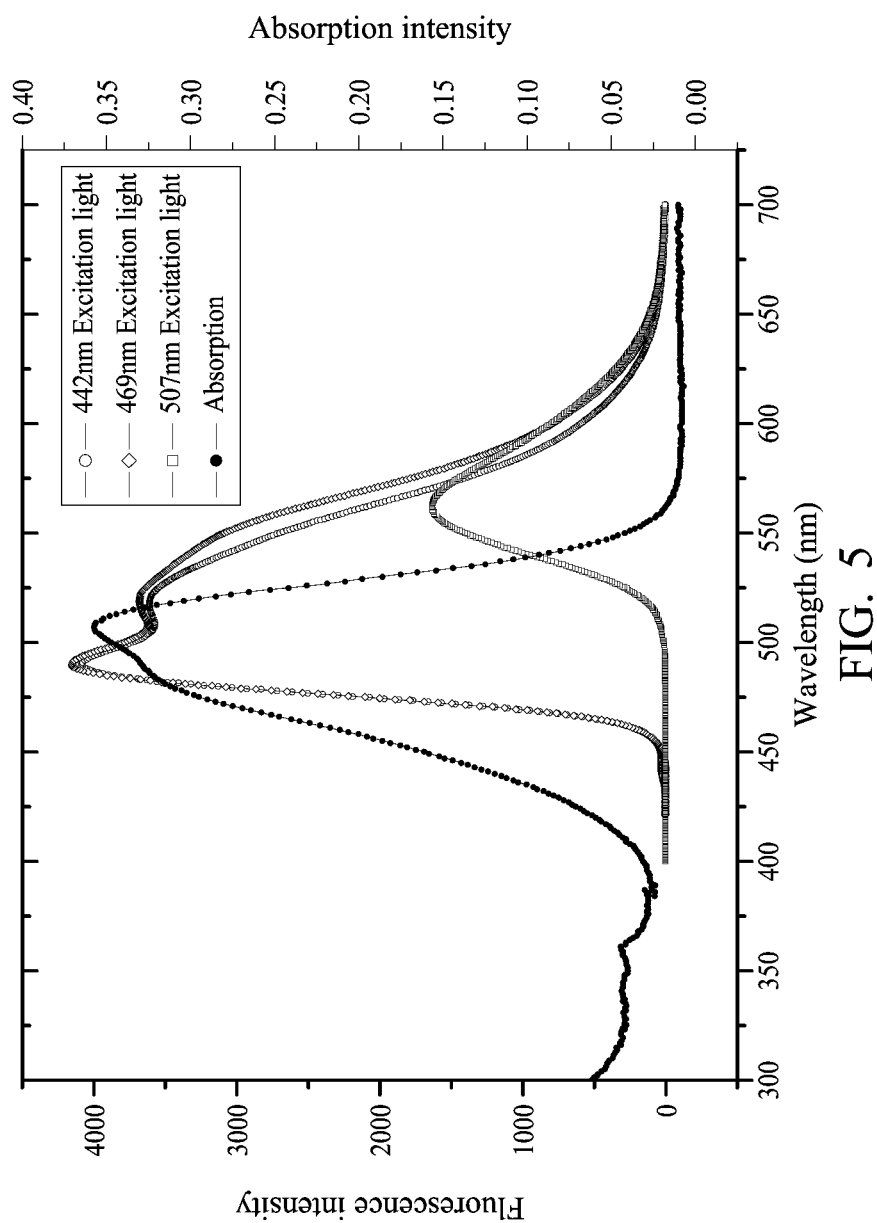
FIG. 5 shows absorption spectra and fluorescence spectra of the polymer PCL-2 in accordance with one embodiment of the disclosure.

The average number molecular weight of the polymer PCL-2 was measured by gel permeation chromatography (GPC) and was 17,352 g/mole, and the molecular weight distribution (polydispersity index, PDI) thereof was 1.21 (as shown in FIG. 4). The absorption spectra and fluorescence spectra of the polymer PCL-2 were measured by absorption and fluorescence spectroscopy (as shown in FIG. 5).

Example 3

Synthesis of the Polymer PCL-3
Scheme:

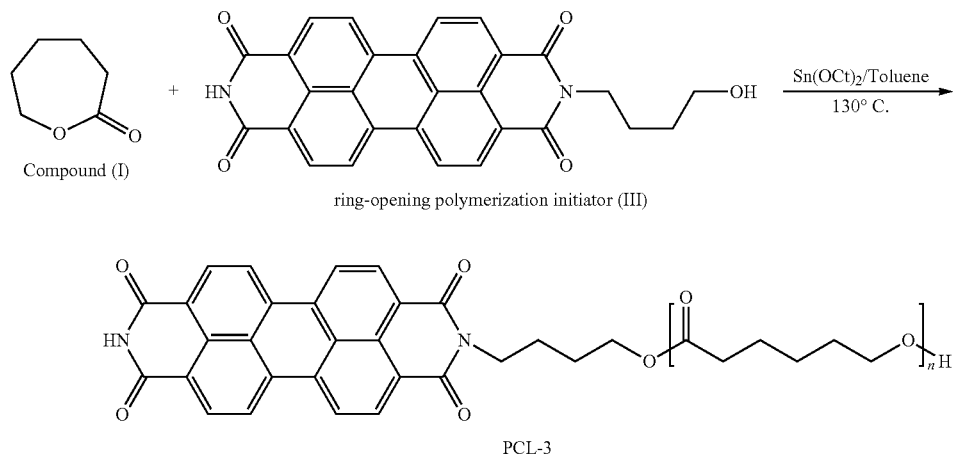

10 g of ε-caprolactone (compound (I)) (877 mmole), 0.01 g of tin(II) 2-ethylhexanoate (Sn(OCt)$_2$) and 0.01 g of ring-opening polymerization initiator (III) (0.022 mmole) were placed in a 0.5 L of round-bottom flask. 10 g of toluene used as a reaction solvent was then added to the flask under room temperature. After the flask was sealed, the reactants were reacted at 130° C. for 8 hours. After the flask was cooled in an ice bath for one hour, 50 ml of methanol was slowly added to the flask and precipitate was then gradually produced. After filtering and drying, 6.5 g of orange solid (PCL-3) was obtained.

The average number molecular weight of the polymer PCL-3 was measured by gel permeation chromatography (GPC) and was 15,300 g/mole, and the molecular weight distribution (polydispersity index, PDI) thereof was 1.25.

Example 4

Synthesis of the Polymer PCL-4
Scheme:

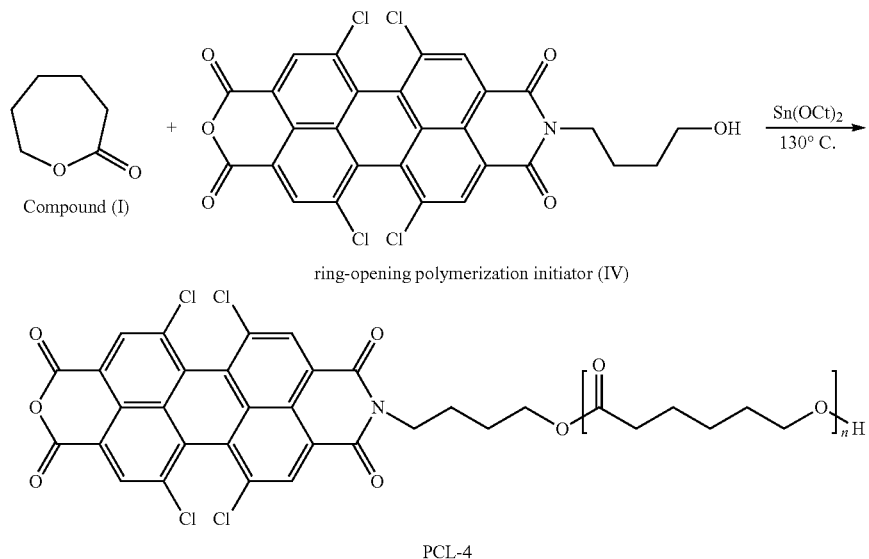

10 g of ε-caprolactone (compound (I)) (877 mmole), 0.01 g of tin(II) 2-ethylhexanoate (Sn(OCt)$_2$) and 0.01 g of ring-opening polymerization initiator (IV) (0.0190 mmole) were placed in a 0.5 L of round-bottom flask. 10 g of toluene used as a reaction solvent was then added to the flask under room temperature. After the flask was sealed, the reactants were reacted at 130° C. for 8 hours. After the flask was cooled in an ice bath for one hour, 50 ml of methanol was slowly added to the flask and precipitate was then gradually produced. After filtering and drying, 6.5 g of orange solid (PCL-4) was obtained.

The average number molecular weight of the polymer PCL-4 was measured by gel permeation chromatography (GPC) and was 15,000 g/mole, and the molecular weight distribution (polydispersity index, PDI) thereof was 1.35.

Example 5

Synthesis of the Polymer PCL-5
Scheme:

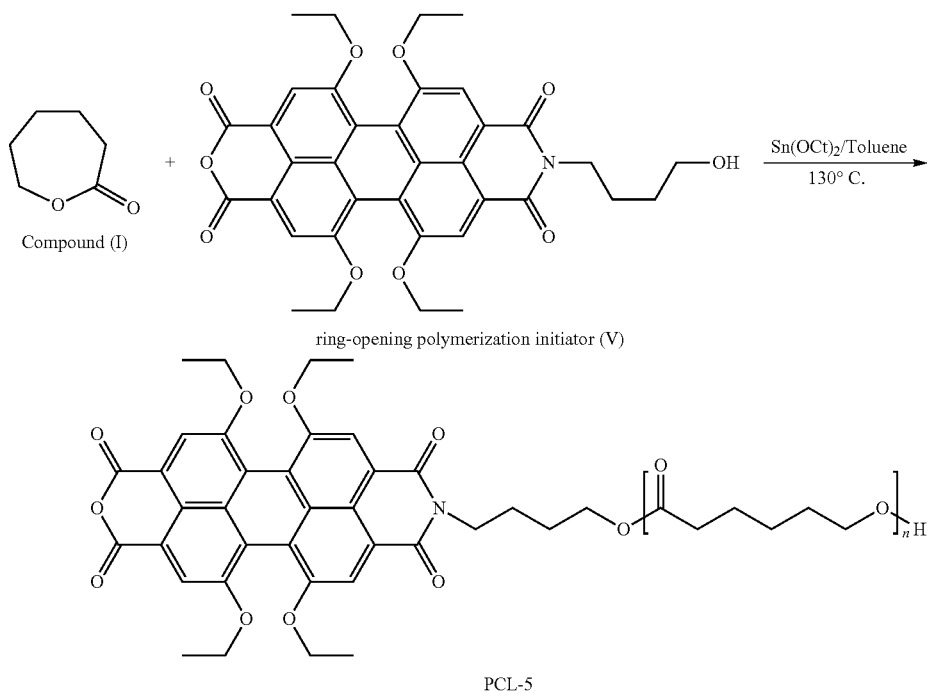

10 g of ε-caprolactone (compound (I)) (877 mmole), 0.01 g of tin(II) 2-ethylhexanoate (Sn(OCt)$_2$) and 0.01 g of ring-opening polymerization initiator (V) (0.0144 mmole) were placed in a 0.5 L of round-bottom flask. 10 g of toluene used as a reaction solvent was then added to the flask under room temperature. After the flask was sealed, the reactants were reacted at 130° C. for 8 hours. After the flask was cooled in an ice bath for one hour, 50 ml of methanol was slowly added to the flask and precipitate was then gradually produced. After filtering and drying, 5.5 g of orange solid (PCL-5) was obtained.

The average number molecular weight of the polymer PCL-5 was measured by gel permeation chromatography (GPC) and was 15,000 g/mole, and the molecular weight distribution (polydispersity index, PDI) thereof was 1.35.

Example 6

Synthesis of the Polymer PCL-6
Scheme:

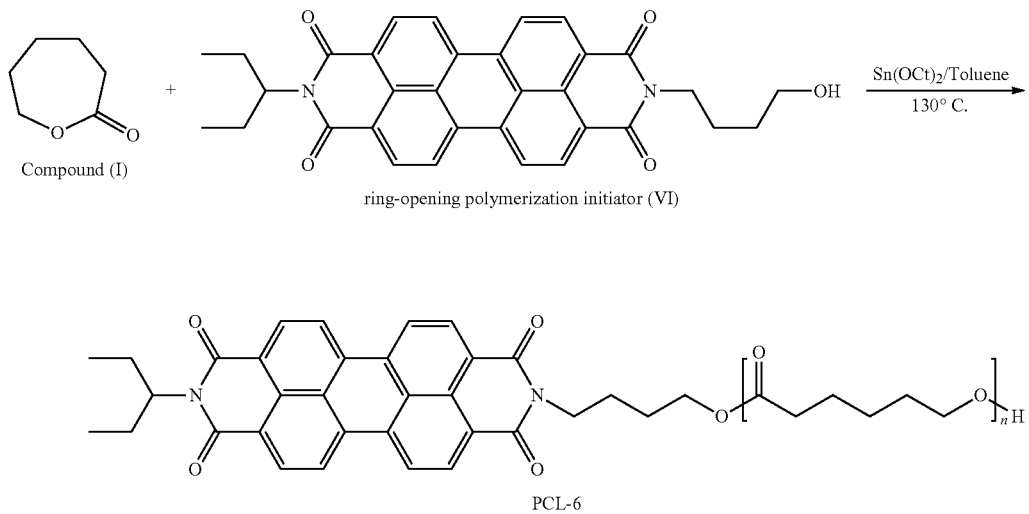

10 g of ε-caprolactone (compound (I)) (877 mmole), 0.01 g of tin(II) 2-ethylhexanoate (Sn(OCt)$_2$) and 0.01 g of ring-opening polymerization initiator (VI) (0.0189 mmole) were placed in a 0.5 L of round-bottom flask. 10 g of toluene used as a reaction solvent was then added to the flask under room temperature. After the flask was sealed, the reactants were reacted at 130° C. for 8 hours. After the flask was cooled in an ice bath for one hour, 50 ml of methanol was slowly added to the flask and precipitate was then gradually produced. After filtering and drying, 7.5 g of orange solid (PCL-6) was obtained.

The average number molecular weight of the polymer PCL-6 was measured by gel permeation chromatography (GPC) and was 14,500 g/mole, and the molecular weight distribution (polydispersity index, PDI) thereof was 1.31.

Example 7

Synthesis of the Polymer PCL-7
Scheme:

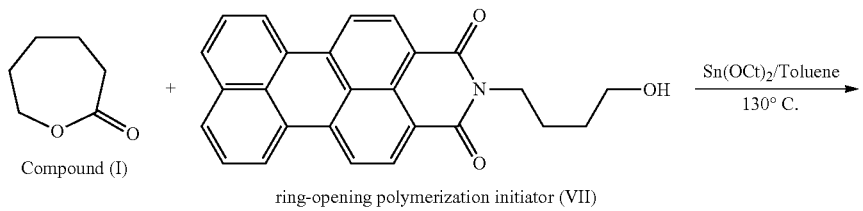

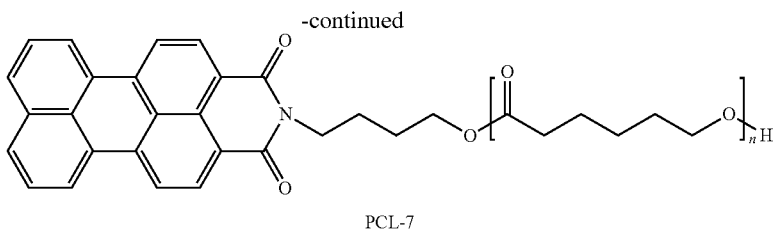

PCL-7

10 g of ε-caprolactone (compound (I)) (877 mmole), 0.01 g of tin(II) 2-ethylhexanoate (Sn(OCt)$_2$) and 0.01 g of ring-opening polymerization initiator (VII) (0.020 mmole) were placed in a 0.5 L of round-bottom flask. 10 g of toluene used as a reaction solvent was then added to the flask under room temperature. After the flask was sealed, the reactants were reacted at 130° C. for 8 hours. After the flask was cooled in an ice bath for one hour, 50 ml of methanol was slowly added to the flask and precipitate was then gradually produced. After filtering and drying, 7.5 g of orange solid (PCL-7) was obtained.

The average number molecular weight of the polymer PCL-7 was measured by gel permeation chromatography (GPC) and was 15,300 g/mole, and the molecular weight distribution (polydispersity index, PDI) thereof was 1.21.

Example 8

Synthesis of the Polymer PCL-8
Scheme:

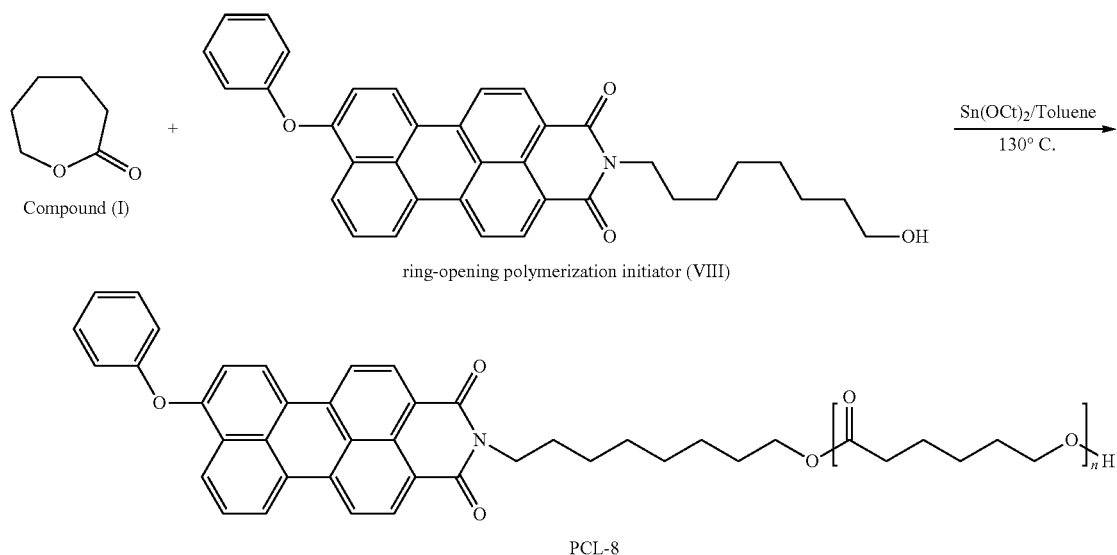

PCL-8

10 g of ε-caprolactone (compound (I)) (877 mmole), 0.01 g of tin(II) 2-ethylhexanoate (Sn(OCt)$_2$) and 0.01 g of ring-opening polymerization initiator (VIII) (0.020 mmole) were placed in a 0.5 L of round-bottom flask. 10 g of toluene used as a reaction solvent was then added to the flask under room temperature. After the flask was sealed, the reactants were reacted at 130° C. for 8 hours. After the flask was cooled in an ice bath for one hour, 50 ml of methanol was slowly added to the flask and precipitate was then gradually produced. After filtering and drying, 5.7 g of orange solid (PCL-8) was obtained.

The average number molecular weight of the polymer PCL-8 was measured by gel permeation chromatography (GPC) and was 14,300 g/mole, and the molecular weight distribution (polydispersity index, PDI) thereof was 1.21.

Example 9

Preparation of the Wavelength-Converting Layer (I)

99 g of ethylene-vinyl acetate (EVA) (Dupont D150, VA content: 32%), 1 g of polymer PCL-2 (prepared from Example 2) and toluene (Tedia, 99%) as a solvent were blended to form a solution. Next, the solution was coated on a glass through a spin-coating process to form a thin film having a thickness of 10-30 μm. A wavelength-converting film was thus obtained.

Example 10

Preparation of the Wavelength-Converting Layer (II)

98 g of ethylene-vinyl acetate (EVA) (Dupont D150, VA content: 32%), 2 g of polymer PCL-2 (prepared from Example 2) and toluene (Tedia, 99%) as a solvent were blended to form a solution. Next, the solution was coated on a glass through a spin-coating process to form a thin film having a thickness of 10-30 μm. A wavelength-converting film was thus obtained.

Example 11

Preparation of the Wavelength-Converting Layer (III)

90 g of ethylene-vinyl acetate (EVA) (Dupont D150, VA content: 32%), 10 g of polymer PCL-2 (prepared from Example 2) and toluene (Tedia, 99%) as a solvent were blended to form a solution. Next, the solution was coated on a glass through a spin-coating process to form a thin film having a thickness of 10-30 μm. A wavelength-converting film was thus obtained.

Example 12

Preparation of the Wavelength-Converting Layer (IV)

98 g of ethylene-vinyl acetate (EVA) (Dupont D150, VA content: 32%), 2 g of polymer PCL-7 (prepared from Example 7) and toluene (Tedia, 99%) as a solvent were blended to form a solution. Next, the solution was coated on a glass through a spin-coating process to form a thin film having a thickness of 10-30 μm. A wavelength-converting film was thus obtained.

Example 13

Preparation of the Wavelength-Converting Layer (V)

90 g of ethylene-vinyl acetate (EVA) (Dupont D150, VA content: 32%), 10 g of polymer PCL-7 (prepared from Example 7) and toluene (Tedia, 99%) as a solvent were blended to form a solution. Next, the solution was coated on a glass through a spin-coating process to form a thin film having a thickness of 10-30 μm. A wavelength-converting film was thus obtained.

The penetration rate and haze of the wavelength-converting films (I)-(V) prepared by Examples 9-13 were measured and the results are shown in Table 2.

TABLE 2

| Examples | Polymers | Resin | Weight ratio | Penetration rate (%) | Haze |
|---|---|---|---|---|---|
| 9 | PCL-2 | EVA | 1/99 | 91.34 | 0.81 |
| 10 | PCL-2 | EVA | 2/98 | 91.71 | 0.81 |
| 11 | PCL-2 | EVA | 10/90 | 91.63 | 0.51 |
| 12 | PCL-7 | EVA | 2/98 | 91.81 | 0.82 |
| 13 | PCL-7 | EVA | 10/90 | 91.74 | 0.86 |

In the commodity application, the penetration rate of the wavelength-converting film is at least more than 85%, and the haze thereof is less than 1.

Example 14

Fabrication of the Wavelength-Converting Device (I)

99.9 g of EVA (Dupont D150) and 0.1 g of wavelength-converting polymer PCL-2 were placed in a single-screw mixer (Japan, MEISEI KINZOKU MFG. CO., LTD. model: FRP-V32C) and granulated. The process temperature of the single-screw mixer was divided into four stages, namely, 75° C., 85° C., 85° C. and 75° C. Next, a pressing machine (GANG LING MACHINERY MACHINERY CO., LTD. model: HP-50) was used. After the pressing machine was preheated at 90° C. for 20 minutes, the wavelength-converting material was pressed at 90° C. for 10 minutes to form a wavelength-converting film. Next, the wavelength-converting film and a PET film with scratch-resistant properties were co-extruded. A wavelength-converting device with a film thickness ranging from 0.01 mm to 0.8 mm was thus obtained.

Example 15

Fabrication of the Wavelength-Converting Device (II)

99.6 g of EVA (Dupont D150) and 0.4 g of wavelength-converting polymer PCL-2 were placed in a single-screw mixer (Japan, MEISEI KINZOKU MFG. CO., LTD. model: FRP-V32C) and granulated. The process temperature of the single-screw mixer was divided into four stages, namely, 75° C., 85° C., 85° C. and 75° C. Next, a pressing machine (GANG LING MACHINERY MACHINERY CO., LTD. model: HP-50) was used. After the pressing machine was preheated at 90° C. for 20 minutes, the wavelength-converting material was pressed at 90° C. for 10 minutes to form a wavelength-converting film. Next, the wavelength-converting film and a PET film with scratch-resistant properties were co-extruded. A wavelength-converting device with a film thickness ranging from 0.01 mm to 0.8 mm was thus obtained.

Example 16

Fabrication of the Wavelength-Converting Device (III)

99.2 g of EVA (Dupont D150) and 0.8 g of wavelength-converting polymer PCL-2 were placed in a single-screw mixer (Japan, MEISEI KINZOKU MFG. CO., LTD. model: FRP-V32C) and granulated. The process temperature of the single-screw mixer was divided into four stages, namely, 75° C., 85° C., 85° C. and 75° C. Next, a pressing machine (GANG LING MACHINERY MACHINERY CO., LTD. model: HP-50) was used. After the pressing machine was preheated at 90° C. for 20 minutes, the wavelength-converting material was pressed at 90° C. for 10 minutes to form a wavelength-converting film. Next, the wavelength-converting film and a PET film with scratch-resistant properties were co-extruded. A wavelength-converting device with a film thickness ranging from 0.01 mm to 0.8 mm was thus obtained.

Comparative Example 1

Fabrication of Conventional Wavelength-Converting Device (I)

99.9 g of EVA (Dupont D150) and 0.1 g of dye (Supra Rubine BL) (EVERLIGHT CHEMICAL INDUSTRIAL CORPORATION) were placed in a single-screw mixer (Japan, MEISEI KINZOKU MFG. CO., LTD. model: FRP-V32C) and granulated. The process temperature of the single-screw mixer was divided into four stages, namely, 75° C., 85° C., 85° C. and 75° C. Next, a pressing machine (GANG LING MACHINERY MACHINERY CO., LTD. model: HP-50) was used. After the pressing machine was preheated at 90° C. for 20 minutes, the wavelength-converting material was pressed at 90° C. for 10 minutes to form a wavelength-converting film. Next, the wavelength-converting film and a PET film with scratch-resistant properties were co-extruded. A wavelength-converting device with a film thickness ranging from 0.125 mm to 0.8 mm was thus obtained.

Comparative Example 2

Fabrication of Conventional Wavelength-Converting Device (II)

A transparent anti-blue light protector (Britain, DEVIA iPad Mini Retina) was used to fabricate a wavelength-converting device.

Comparative Example 3

Fabrication of Conventional Wavelength-Converting Device (III)

An anti-blue light iPad protector (Green Onions Apple iPad mini) was used to fabricate a wavelength-converting device.

The blocking rate, penetration rate, air base and color shift of the wavelength-converting devices fabricated by Examples 14-16 and Comparative Examples 1-3 were measured and the results are shown in Table 3.

TABLE 3

| | | Example 14 | Example 15 | Example 16 | Com. Example 1 | Com. Example 2 | Com. Example 3 |
|---|---|---|---|---|---|---|---|
| Weight ratio (PCL-2/EVA) | | 0.1/99.9 | 0.4/99.6 | 0.8/99.2 | | | |
| Blocking rate (%) | 315 nm | 97.2 | 97.4 | 97.8 | 98.8 | 92 | 97 |
| | 410 nm | 12 | 13 | 18 | 11.2 | 10.2 | 42.3 |
| | 475 nm | 10.5 | 11.8 | 19.6 | 9.2 | 8.3 | 9.7 |
| | 500 nm | 10.5 | 13.4 | 28 | 9.6 | 8.5 | 8.2 |
| Penetration rate (%) | 315 nm | 2.8 | 2.6 | 2.2 | 1.2 | 8 | 3 |
| | 410 nm | 88 | 87 | 82 | 88.8 | 89.8 | 57.7 |
| | 475 nm | 89.5 | 88.2 | 80.4 | 90.8 | 91.7 | 90.3 |
| | 500 nm | 89.5 | 86.6 | 72 | 90.4 | 91.5 | 91.8 |
| Air base | Haze | 0.8 | 0.85 | 0.95 | 2.22 | 0.58 | 0.8 |
| | T.t. | 90.5 | 90.5 | 91.0 | 91.32 | 92.08 | 92.28 |
| Adhesive residue | | No | No | No | No | Has | Has |
| Color shift | | No | No | No | Purple | Yellow | Yellow |

It will be apparent to those skilled in the art that various modifications and variations can be made to the disclosed embodiments. It is intended that the specification and examples be considered as exemplary only, with the true scope of the disclosure being indicated by the following claims and their equivalents.

What is claimed is:

1. A wavelength-converting polymer having a chemical structure represented by formula (I):

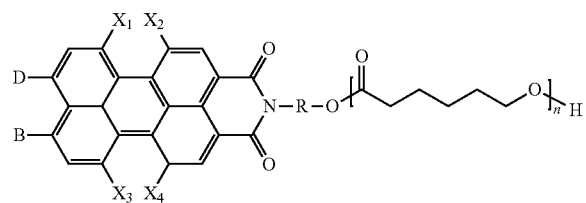

(I)

wherein B and D are the same or different and independently include hydrogen, $C_{1-8}$ alkyl group, $C_{1-8}$ alkoxy group, aryloxy group, carboxyl group, —COOK, —COONa or —NH$_2$, or B and D are connected to form a heteroaromatic ring,

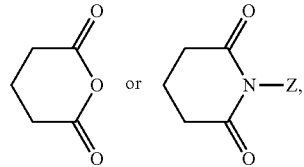

wherein, Z is hydrogen, $C_{5-8}$ alkyl group, cycloalkyl group or aryloxy group, $X_1$-$X_4$ are the same or different and independently include hydrogen, halogen, $C_{1-8}$ alkyl group or $C_{1-8}$ alkoxy group, R is $C_{1-8}$ alkyl group with or without substitution, and n is an integer of 5 to 1,000.

2. The wavelength-converting polymer as claimed in claim 1, wherein the aryloxy group is substituted or unsubstituted phenoxy group.

3. The wavelength-converting polymer as claimed in claim 1, wherein Z is hydrogen, $C_{5-8}$ alkyl group or cycloalkyl group.

4. The wavelength-converting polymer as claimed in claim 1, wherein the polymer has a weight average molecular weight ranging from 500 to 100,000 g/mole.

5. The wavelength-converting polymer as claimed in claim 1, wherein the polymer comprises:

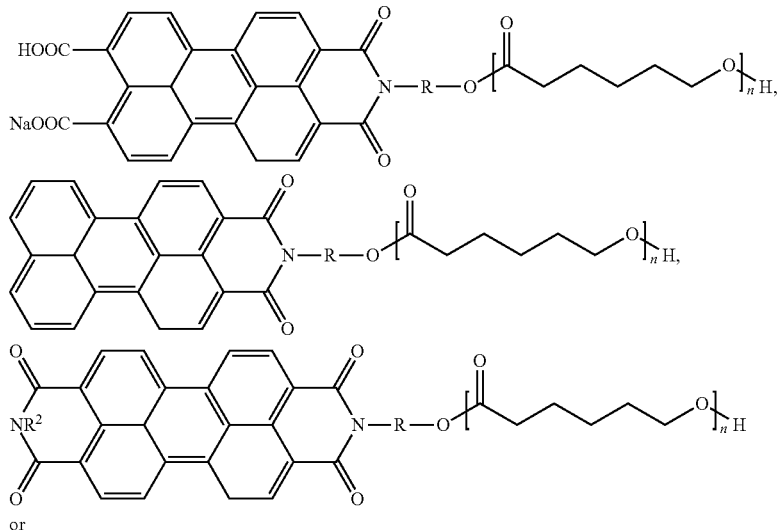

or

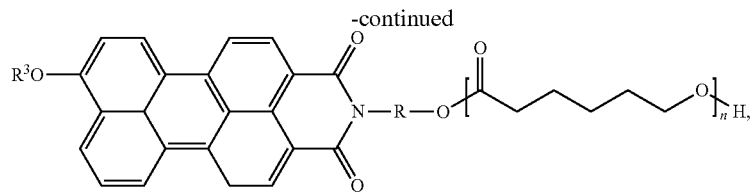

wherein R is $C_{1-8}$ alkyl group, $R^2$ is hydrogen, $C_{5-8}$ alkyl group or cycloalkyl group, $R^3$ is $C_{1-8}$ alkyl group or substituted or unsubstituted benzene, and n is an integer of 5 to 1,000.

6. The wavelength-converting polymer as claimed in claim 1, wherein the polymer comprises:

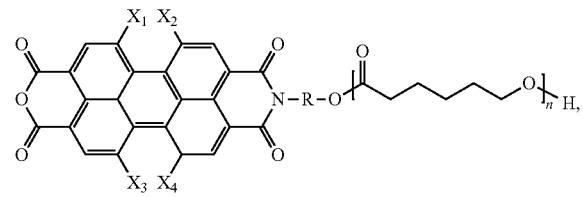

wherein R is $C_{1-8}$ alkyl group, $X_1$-$X_4$ are the same or different and independently include hydrogen, halogen, $C_{1-8}$ alkyl group or $C_{1-8}$ alkoxy group, and n is an integer of 5 to 1,000.

7. A method for fabricating a wavelength-converting polymer, comprising:

providing a fluorescent ring-opening polymerization initiator, caprolactone, a catalyst and organic solvent; and adding the fluorescent ring-opening polymerization initiator, the caprolactone and the catalyst to the organic solvent with heating to react to form a polymer, wherein the fluorescent ring-opening polymerization initiator has a chemical structure represented by formula (II):

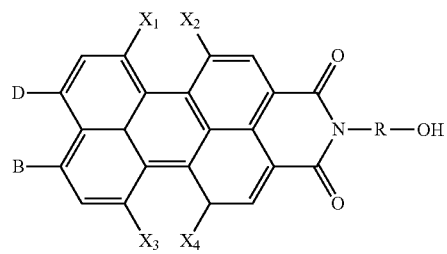

(II)

wherein B and D are the same or different and independently include hydrogen, $C_{1-8}$ alkyl group, $C_{1-8}$ alkoxy group, aryloxy group, carboxyl group, —COOK, —COONa or —NH$_2$, or B and D are connected to form a heteroaromatic ring,

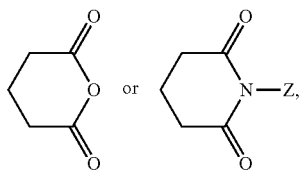

wherein Z is hydrogen, $C_{5-8}$ alkyl group, cycloalkyl group or aryloxy group, $X_1$-$X_4$ are the same or different and independently include hydrogen, halogen, $C_{1-8}$ alkyl group or $C_{1-8}$ alkoxy group, and R is $C_{1-8}$ alkyl group with or without substitution, wherein the caprolactone and the fluorescent ring-opening polymerization initiator have a molar ratio ranging from 10 to 1,000.

8. The method for fabricating a wavelength-converting polymer as claimed in claim 7, wherein the fluorescent ring-opening polymerization initiator comprises:

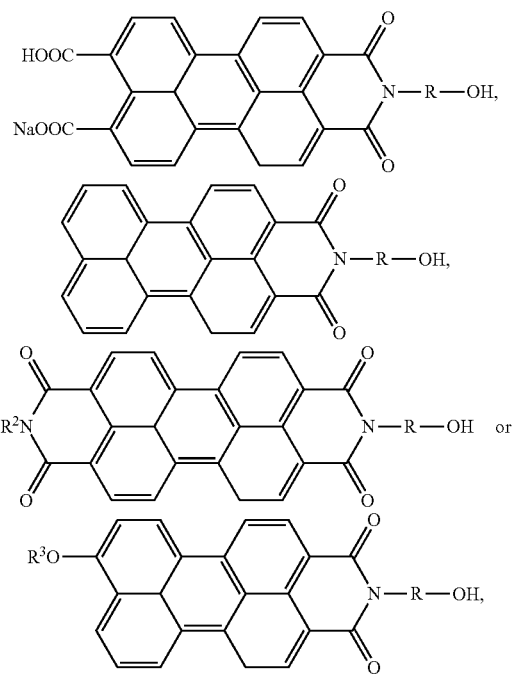

wherein R is $C_{1-8}$ alkyl group with or without substitution, $R^2$ is hydrogen, $C_{5-8}$ alkyl group or cycloalkyl group, and $R^3$ is $C_{1-8}$ alkyl group or substituted or unsubstituted benzene.

9. The method for fabricating a wavelength-converting polymer as claimed in claim 7, wherein the fluorescent ring-opening polymerization initiator comprises:

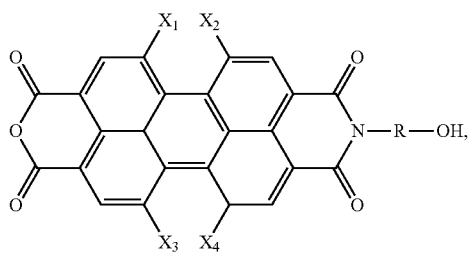

wherein R is $C_{1-8}$ alkyl group with or without substitution and $X_1$-$X_4$ are the same or different and independently include hydrogen, halogen, $C_{1-8}$ alkyl group or $C_{1-8}$ alkoxy group.

10. A wavelength-converting device, comprising:
  a wavelength-converting layer;
  a polyester layer disposed on a surface of the wavelength-converting layer; and
  a protection layer disposed on a surface of the polyester layer, opposite the wavelength-converting layer, wherein the wavelength-converting layer comprises a wavelength-converting polymer as claimed in claim 1.

11. The wavelength-converting device as claimed in claim 10, wherein the device has a total thickness ranging from 0.125 mm to 0.8 mm.

12. The wavelength-converting device as claimed in claim 10, further comprising a substrate disposed on a surface of the wavelength-converting layer, opposite the polyester layer.

13. The wavelength-converting device as claimed in claim 12, wherein the substrate comprises a release layer, a glass substrate, a plastic substrate, display devices or hand-held devices.

14. The wavelength-converting device as claimed in claim 10, wherein the wavelength-converting layer comprises a wavelength-converting polymer.

15. The wavelength-converting device as claimed in claim 10, wherein the wavelength-converting layer further comprises a resin.

16. The wavelength-converting device as claimed in claim 15, wherein the wavelength-converting polymer and the resin in the wavelength-converting layer have a weight ratio ranging from 0.1:99.9 to 20:80.

17. The wavelength-converting device as claimed in claim 15, wherein the resin comprises ethylene-vinyl acetate (EVA), thermoplastic urethane (TPU) or polyvinyl butyral (PVB).

18. The wavelength-converting device as claimed in claim 13, wherein the release layer comprises silicon-containing resin, fluorine-containing resin or silicon/fluorine-containing resin.

19. The wavelength-converting device as claimed in claim 10, wherein the polyester layer comprises polyethylene terephthalate (PET), polycarbonate (PC), poly(methyl methacrylate) (PMMA) or cyclo olefin polymer (COP).

20. The wavelength-converting device as claimed in claim 10, wherein the protection layer comprises acrylic resin, silicon-containing acrylic resin, fluorine-containing acrylic resin, silicon/fluorine-containing acrylic resin, silicon-containing resin, fluorine-containing resin or silicon/fluorine-containing resin.

* * * * *